(12) United States Patent
Keskula et al.

(10) Patent No.: US 6,709,780 B2
(45) Date of Patent: Mar. 23, 2004

(54) SYSTEM AND METHOD FOR CONTROLLING STEAM IN A FUEL SYSTEM WITH A FUEL PROCESSOR

(75) Inventors: Donald H. Keskula, Webster, NY (US); Bruce J. Clingerman, Palmyra, NY (US); Steven D. Burch, Honeoye Falls, NY (US); Paul T. Yu, Pittsford, NY (US)

(73) Assignee: General Motors Corporation, Detroit, MI (US)

( * ) Notice: Subject to any disclaimer, the term of this patent is extended or adjusted under 35 U.S.C. 154(b) by 25 days.

(21) Appl. No.: 10/136,843

(22) Filed: Apr. 30, 2002

(65) Prior Publication Data

US 2003/0203256 A1 Oct. 30, 2003

(51) Int. Cl.$^7$ .............................................. H01M 8/04
(52) U.S. Cl. ........................................... 429/25; 429/13
(58) Field of Search ...................................... 429/25, 13

(56) References Cited

U.S. PATENT DOCUMENTS 4,002,805 A * 1/1977 Waldman ..................... 429/17
4,098,959 A * 7/1978 Fanciullo ..................... 429/25

FOREIGN PATENT DOCUMENTS

JP 11-126629 * 5/1999

OTHER PUBLICATIONS

Notification of Transmittal Of The International Search Report Or The Declaration, dated Aug. 18, 2003.

* cited by examiner

Primary Examiner—John S. Maples
(74) Attorney, Agent, or Firm—Cary W. Brooks; Linda M. Deschere

(57) ABSTRACT

A control system controls steam in a fuel cell system including a fuel processor. A fuel cell has run, standby and shutdown operating modes. A fuel processor provides reformate to the fuel cell. A pressure sensor generates a pressure signal based on a pressure of steam supplied to the fuel processor. A valve directs steam to or vents steam away from the fuel processor. A controller communicates with the pressure sensor, the fuel cell and the valve and controls the valve based on the operating mode of the fuel cell and the pressure signal. The controller opens the valve during the shutdown mode. The controller closes the valve during the run operating mode. The controller initially closes the valve during the standby mode. The controller opens the valve if the pressure signal exceeds a first predetermined pressure value and closes the valve when the pressure falls.

20 Claims, 3 Drawing Sheets

US 6,709,780 B2

SYSTEM AND METHOD FOR CONTROLLING STEAM IN A FUEL SYSTEM WITH A FUEL PROCESSOR

FIELD OF THE INVENTION

The present invention relates to systems including a fuel cell, and more particularly to a system and method for controlling steam in a fuel cell system with a fuel processor.

BACKGROUND OF THE INVENTION

Fuel processors in fuel cell systems convert hydrocarbon fuel, such as gasoline or methanol, into a rich hydrogen stream. The hydrocarbon fuel is reformed to the hydrogen stream through a series of reactions with steam and/or air. Using exothermic heat, steam is generated, superheated, and fed to the fuel processor. Operation of the fuel processor requires effective balancing of the reaction chemistry. Balancing is accomplished by controlling reactor temperature and pressures, stream composition, and steam generation. The temperature of the heat exchanger affects steam generation.

The fuel processors typically include autothermal reactors, steam reformers, preferential oxidizers (PrOx), and/or water gas shift reactors. The steam that is required by the fuel processor is typically generated in vaporizers, such as a heat exchanger/vaporizer or a combustor/vaporizer. After shutdown, steam that remains in the autothermal reactors, steam reformers, PrOx and/or water gas shift reactors condenses to liquid water. Liquid water that remains in these fuel processor components after shutdown causes problems with catalysts, especially shift catalysts. Liquid water also promotes corrosion in these components. The remaining water adversely impacts durability and causes restart problems at and below freezing temperatures.

SUMMARY OF THE INVENTION

A control system and method according to the present invention controls steam in a fuel cell system including a fuel processor. The fuel cell has run, standby and shutdown operating modes. The fuel processor provides reformate to the fuel cell. A pressure sensor generates a pressure signal based on a pressure of steam supplied to the fuel processor. A valve selectively vents steam away from the fuel processor. A controller communicates with the pressure sensor, the fuel cell and the valve and controls the valve based on the operating mode of the fuel cell and the pressure signal.

In other features, the controller opens the valve to prevent steam from reaching the fuel processor during the shutdown mode. The controller closes the valve during the run operating mode. The controller initially closes the valve during the standby mode to maintain steam in vaporizers of the fuel processor for fast startup. During the standby mode, the controller opens the valve if the pressure signal exceeds a first predetermined pressure value. The controller subsequently closes the valve if the pressure falls below a second predetermined pressure value and/or after a first predetermined period elapses.

In still other features, the fuel processor includes at least one of a water gas shift reactor, a steam reformer, PrOx, and an autothermal reactor. A conduit supplies the steam to the fuel processor. A pressure regulator is coupled to the conduit.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
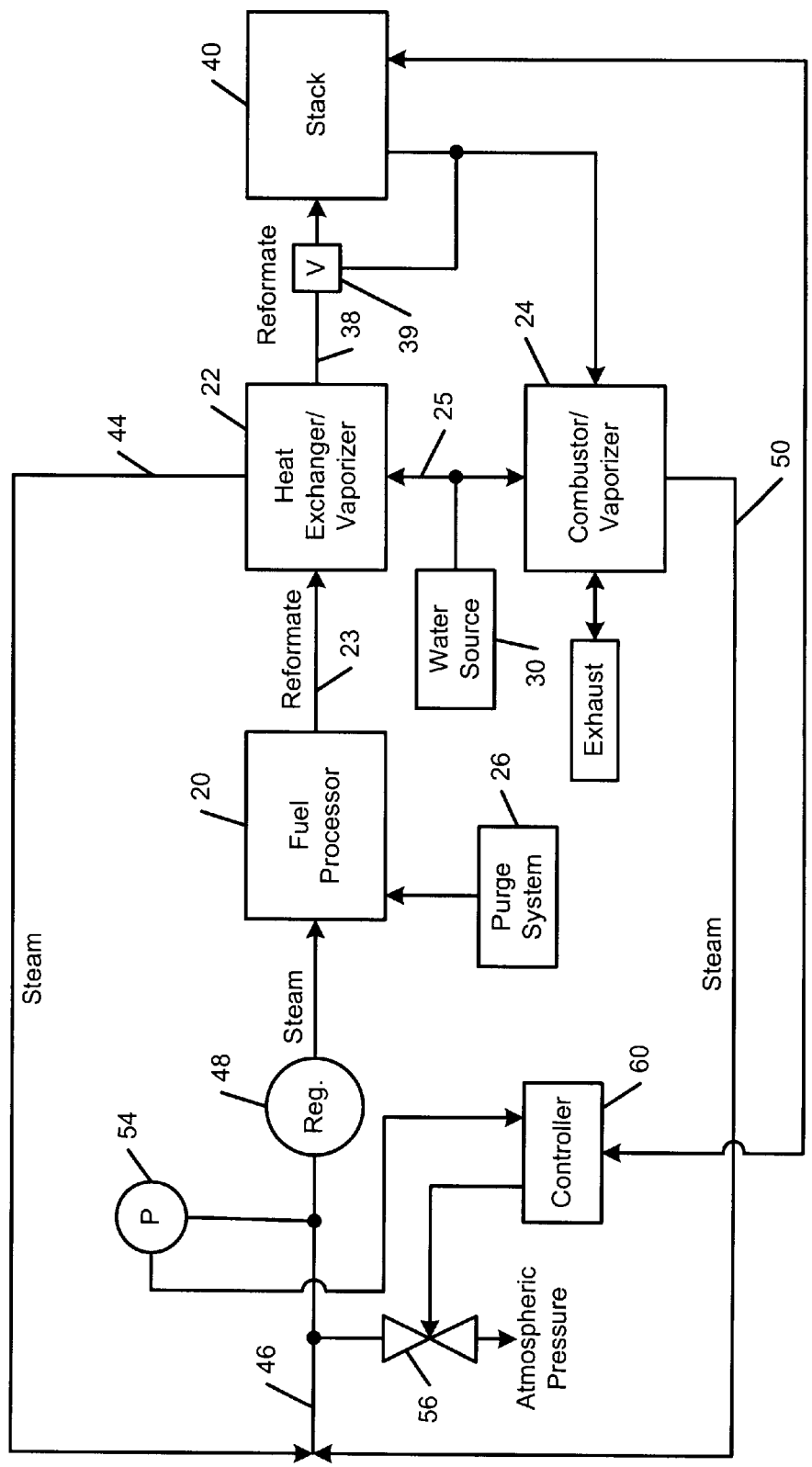
FIG. 1 is a functional block diagram of a control system for controlling steam in a fuel processor of a fuel cell.

The following description of the preferred embodiment(s) is merely exemplary in nature and is in no way intended to limit the invention, its application, or uses. For purposes of clarity, the same reference numerals will be used in the drawings to identify similar elements.

To avoid problems associated with liquid water, the present invention provides a valve and a control system that vents steam before the steam enters the fuel processor. When the valve is opened (allowing flow), the control system and the valve divert the steam away from the fuel processor.

Referring now to FIG. 1, a control system for controlling steam in a fuel processor 20 of a fuel cell is shown. The fuel processor 20 includes at least one of a water gas shift reactor, an autothermal reactor, a preferential oxidizer (PrOx), and a steam reformer. A heat exchanger/vaporizer 22 receives reformate through a conduit from the fuel processor 20. A combustor/vaporizer 24 is connected by a conduit to the heat exchanger/vaporizer 22. A purge system 26 is coupled to the fuel processor 20. The purge system 26 typically employs nitrogen $N_2$ for purging.

A source 30 provides liquid water to the conduit 25 between the heat exchanger/vaporizer 22 and the combustor/vaporizer 24. A first output 38 of the heat exchanger/vaporizer 22 supplies reformate through a three-way valve 39 to a fuel cell stack 40. The three way valve 39 can be used to bypass the fuel cell stack 40, for example during shutdown. A second output 44 of the heat exchanger directs steam to a conduit 46 that is coupled to a pressure regulator 48. An output 50 of the combustor/vaporizer 24 also directs steam to the conduit 46 and the pressure regulator 48.

Heat from the fuel processor 20 travels to the combustor/vaporizer 24 during shutdown. The reformate out of the fuel cell stack 40 travels to the combustor/vaporizer 24 and then out to an exhaust. Reformate can also bypass the stack during shutdown (via the three-way valve 39). Reformate travels from the fuel processor 20 to the combustor/vaporizer 24.

A pressure sensor 54 measures a pressure of the steam. A valve 56 is coupled to the conduit 46. When the valve 56 is opened, the conduit 46 is vented to atmospheric pressure. The valve is preferably normally open. A controller 60 communicates with the valve 56 and to the pressure sensor 54.

When running, the fuel processor 20 uses the steam from the heat exchanger/vaporizer 22 and the combustor/vaporizer 24. The controller 60 sets the valve 56 to a closed (no-flow) condition. The steam is directed through a pressure regulator 48 (having a pressure setpoint) to the fuel processor 20 of the fuel processor 20.

During a fuel processor shutdown, reactants (fuel, steam, and air) are stopped. However, the heat at the front of the fuel processor 20 travels downstream as the flows subside. Due to the heat still contained within the fuel processor 20, liquid water in the heat exchanger/vaporizer 22 and the combustor/vaporizer 24 tends to continue vaporizing. This causes a surge in the steam pressure. Steam flows into the fuel processor 20. To avoid this, the controller 60 opens the valve 56 (allowing flow) during the shutdown mode. The steam prefers the less restrictive path out the valve 56, to prevent steam from entering the fuel processor 20. Water vaporization continues at shutdown due to heat traveling downstream and to the heat in the mass of the vaporizer. The liquid water comes from the water accumulated in the vaporizer tanks and plumbing.

Once the fuel processor 20 is in standby mode (awaiting a restart), the fuel processor components typically stay at temperatures well above vaporization temperatures for many minutes or even hours (depending on the mass and amount of insulation). As temperatures normalize, heat may conduct to the vaporizers, which causes a steam surge after shutdown is complete. Steam can get in the fuel processor 20 at an undesirable time.

While in the standby mode, it is desirable to keep steam out of the fuel processor 20 (for durability). However, it is also desirable to keep water in the heat exchanger/vaporizer 22 and the combustor/vaporizer 24 (for faster restart). To accomplish this, the valve 56 is set to a no flow condition immediately after the fuel processor 20 completes shutdown. The controller 60 monitors the pressure P of the conduit 46. If the pressure P approaches the point where the regulator 48 will allow steam to flow into the fuel processor 20, the valve 56 is opened to prevent flow into the fuel processor 20. After the pressure P drops to a predetermined level and/or after a predetermined period T, the controller 60 closes the vent valve 56.

Figure 2:
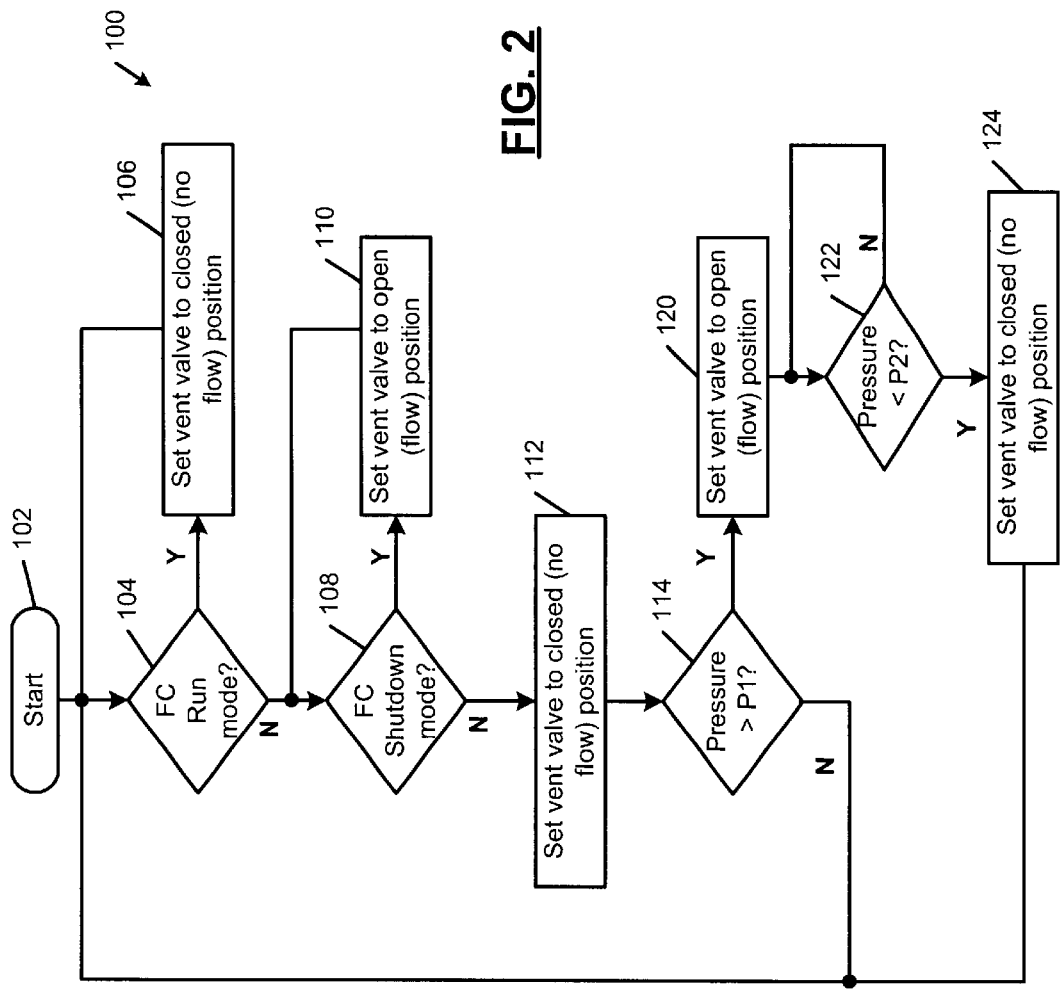
FIG. 2 illustrates steps of a first method for controlling steam to the fuel processor in FIG. 1.

Referring now to FIG. 2, steps that are performed by the controller 60 are shown generally at 100. Control begins at step 102. In step 104, the controller 60 determines whether the fuel cell is in a run operating mode. If it is, the controller 60 sets the valve 56 to a closed position in step 106 and returns to step 104. If not, control continues with step 108 where the controller 60 determines whether the fuel cell is in a shutdown operating mode. If it is, control continues with step 110, sets the valve 56 to an open position and returns to step 108. Otherwise, control continues with step 112 (corresponding to standby operating mode) and sets the valve 56 to a closed position.

In step 114, control determines whether pressure measured by the pressure sensor 54 is greater than a first predetermined pressure P1. If not, control loops back to step 104. Otherwise, control continues with step 120 and sets the valve 56 to an open position. In step 122, the controller 60 determines whether pressure is less than a second predetermined pressure P2. P2 can be equal or less than P1 to provide hysteresis to the valve control. If not, control loops back to step 122. Otherwise, control continues with step 124 and sets the valve 56 to a closed position. Control continues from step 124 and loops back to step 104.

Figure 3:
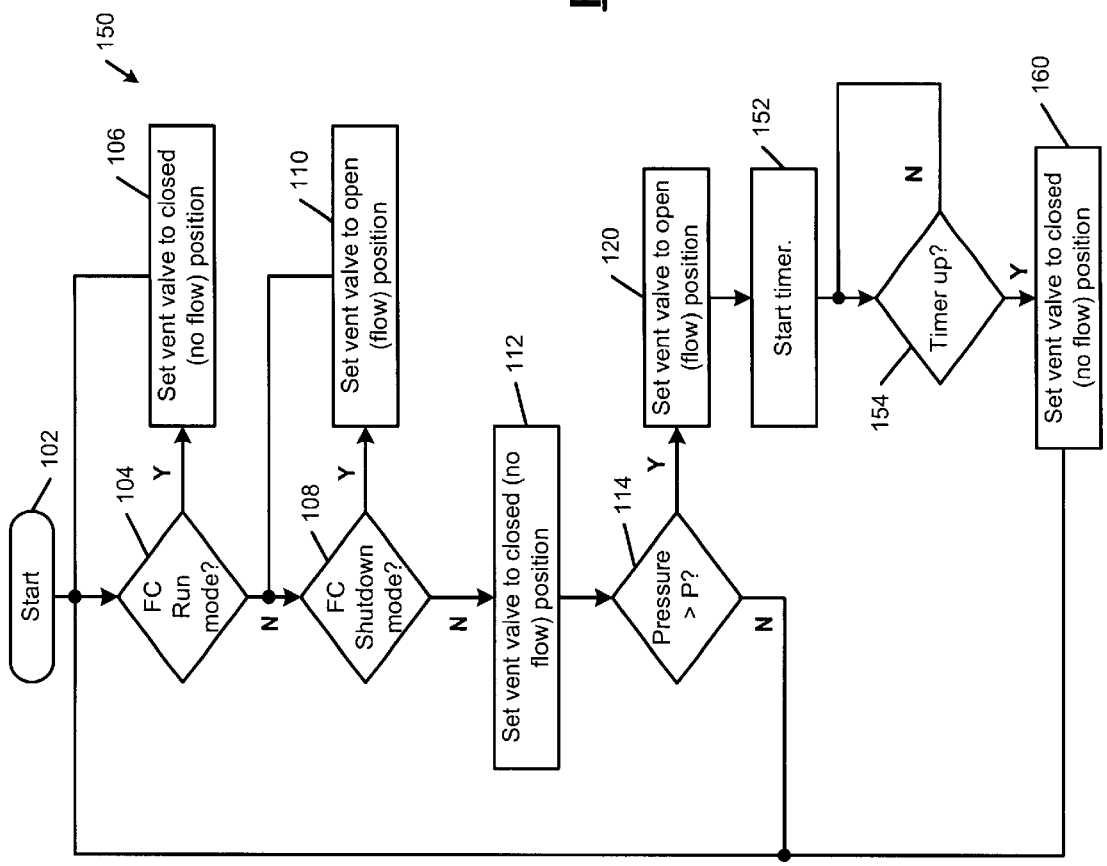
FIG. 3 illustrates steps of a second method for controlling steam to the fuel processor in FIG. 1.

Referring now to FIG. 3, steps of an alternate method that is performed by the controller 60 is shown at 150. Steps 102–120 are similar to those described above in connection with FIG. 2. Control continues from step 120 to step 152 where the controller 60 starts a timer having a first predetermined period. Control continues from step 152 to step 154 where the controller 60 determines whether the timer is up. If not, control loops back to step 154. Otherwise, control continues with step 160 where the controller 60 closes the valve 56. Control continues from step 160 to step 104.

The valve 56 can be replaced with a three-way valve to accomplish the same function. The valve 56 can also be a proportional valve. The proportional valve allows a specific pressure that is below the regulator setpoint pressure to be maintained. While a system with two vaporizers is shown, the control approach of the present invention also applies to systems with heat sources of different types, number, and placement. The pressure sensor 54 can be a physical sensor or a virtual sensor. Virtual sensors employ a model that derives pressure based on other system sensors. The present invention reduces steam and steam condensate from collecting in the fuel processor 20. The present invention maintains a water buffer (the max allowed by the regulator) in the water delivery system for a faster hot restart.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A control system for controlling steam in a fuel cell system including a fuel processor, comprising:
    a fuel cell;
    a fuel processor that provides reformate to said fuel cell;
    a pressure sensor that generates a pressure signal based on a pressure of steam supplied to said fuel processor;
    a valve that selectively directs steam to and vents steam away from said fuel processor; and
    a controller that communicates with said pressure sensor, said fuel cell and said valve and that controls said valve based on said operating mode of said fuel cell and said pressure signal.

2. The control system of claim 1 wherein said fuel cell has run, standby and shutdown operating modes and wherein said controller opens said valve to prevent steam from reaching said fuel processor during said shutdown mode.

3. The control system of claim 1 wherein said valve is a proportional valve.

4. The control system of claim 2 wherein said controller closes said valve during said run operating mode.

5. The control system of claim 2 wherein said controller initially closes said valve during said standby mode to maintain steam in vaporizers coupled to said fuel processor for fast startup.

6. The control system of claim 5 wherein during said standby mode, said controller opens said valve if said pressure signal exceeds a first predetermined pressure value.

7. The control system of claim 6 wherein during said standby mode, said controller closes said valve after opening said valve if said pressure falls below a second predetermined pressure value.

8. The control system of claim 6 wherein during said standby mode, said controller closes said valve after opening said valve after a first predetermined period.

9. The control system of claim 1 wherein said fuel processor includes at least one of a steam reformer, an autothermal reactor, a preferential oxidizer, and a water gas shift reactor.

10. The control system of claim 9 further comprising:
   a heat exchanger/vaporizer that is in fluid communication with said fuel processor; and
   a combustor/vaporizer that is in fluid communication with said fuel processor.

11. A method for controlling steam in a fuel cell system including a fuel processor, comprising:
   operating a fuel cell in run, standby and shutdown operating modes;
   generating a pressure signal based on steam pressure supplied to said fuel processor; and
   controlling a valve to vary steam supplied to said fuel processor based on an operating mode of said fuel cell and said pressure signal.

12. The method of claim 11 further comprising opening said valve to prevent steam from reaching said fuel processor during said shutdown mode.

13. The method of claim 11 wherein said valve is a proportional valve.

14. The method of claim 11 further comprising closing said valve during said run operating mode.

15. The method of claim 11 further comprising initially closing said valve during said standby mode to maintain steam in vaporizers of said fuel processor for fast startup.

16. The method of claim 15 further comprising opening said valve if said pressure exceeds a first predetermined pressure value during said standby mode.

17. The method of claim 16 further comprising closing said valve after opening said valve if said pressure falls below a second predetermined pressure value during said standby mode.

18. The method of claim 16 further comprising closing said valve after opening said valve during said standby mode after a first predetermined period.

19. The method of claim 11 wherein said fuel processor includes at least one of a water gas shift reactor, an autothermal reactor, a preferential oxidizer, and a steam reformer.

20. The method of claim 11 further comprising:
   supplying said steam to said fuel processor in a conduit; and
   regulating pressure in said conduit.

* * * * *